US012110209B1

(12) United States Patent
Reynolds et al.

(10) Patent No.: US 12,110,209 B1
(45) Date of Patent: Oct. 8, 2024

(54) ELEVATOR CAR DOOR LOCK

(71) Applicant: The Peelle Company, Smithtown, NY (US)

(72) Inventors: Steven P. Reynolds, Toronto (CA); Richard W. Lajeunesse, Brampton (CA); Zygmunt Dziwak, Mississauga (CA)

(73) Assignee: THE PEELLE COMPANY, Smithtown, NY (US)

( * ) Notice: Subject to any disclaimer, the term of this patent is extended or adjusted under 35 U.S.C. 154(b) by 0 days.

(21) Appl. No.: 18/303,610

(22) Filed: Apr. 20, 2023

(51) Int. Cl.
*B66B 13/20* (2006.01)

(52) U.S. Cl.
CPC .................................... *B66B 13/20* (2013.01)

(58) Field of Classification Search
CPC ......... B66B 13/20; B66B 13/06; B66B 13/12; B66B 11/02; B66B 13/04; B66B 13/10; B66B 13/16
See application file for complete search history.

(56) References Cited

U.S. PATENT DOCUMENTS

| | | | | |
|---|---|---|---|---|
| 1,961,938 A * | 6/1934 | Norton | B66B 13/08 | 187/331 |
| 2,624,081 A * | 1/1953 | Schweig | B66B 13/06 | 49/98 |
| 5,139,112 A * | 8/1992 | Tonna | B66B 13/16 | 187/331 |
| 2004/0216961 A1 * | 11/2004 | Spiess | B66B 13/308 | 187/313 |

FOREIGN PATENT DOCUMENTS

| | | | |
|---|---|---|---|
| DE | 112012006072 T5 * | 12/2014 | B66B 13/20 |
| ES | 2328707 T3 * | 11/2009 | B66B 17/34 |
| WO | WO-2017023928 A1 * | 2/2017 | B66B 13/12 |

* cited by examiner

*Primary Examiner* — Diem M Tran
(74) *Attorney, Agent, or Firm* — Pearne & Gordon LLP

(57) ABSTRACT

An elevator car with a retiring cam for releasing a landing door lock, a lock for maintaining a car door locked, the retiring cam being constructed and arranged to unlock the car door lock when deployed to unlock a landing door.

6 Claims, 2 Drawing Sheets

ELEVATOR CAR DOOR LOCK

BACKGROUND OF THE INVENTION

The invention relates to elevator doors or gates and, in particular, to a lock for such doors or gates.

PRIOR ART

Elevator landing doors are typically locked against opening unless an elevator car is positioned at the landing On the other hand, elevator car doors or gates are not always locked when the car is in motion and/or between landings or floors. There is a need for a practical car door or gate lock when a car is in motion or between floors for new elevator systems and simple enough for retrofitting existing elevator systems.

SUMMARY OF THE INVENTION

The invention provides an all mechanical lock for elevator car doors or gates that utilizes retiring cam extension motion, traditionally used for landing door lock control, and conditioned by the inventive mechanism for proper registration with a landing. In both disclosed versions of the invention, a car door locking bolt is released when the retiring cam, carried on the car, extends and the car is confirmed by the invention to be aligned with a landing or floor, both vertically and horizontally. In one disclosed version, the retiring cam has an attached auxiliary face that can be displaced only when aligned with a landing door lock releasing mechanism, thereby assuring by such displacement that the car is properly located at a landing. Displacement of the auxiliary face is used to release the locking bolt.

In another disclosed version, the retiring cam is fitted with a sensing roller that engages a dedicated cam surface at the landing. The locking bolt will be released only if the sensing roller engages the dedicated cam surface thereby assuring by such displacement that the car is at a landing.

DESCRIPTION OF THE PREFERRED EMBODIMENTS

Figure 1:
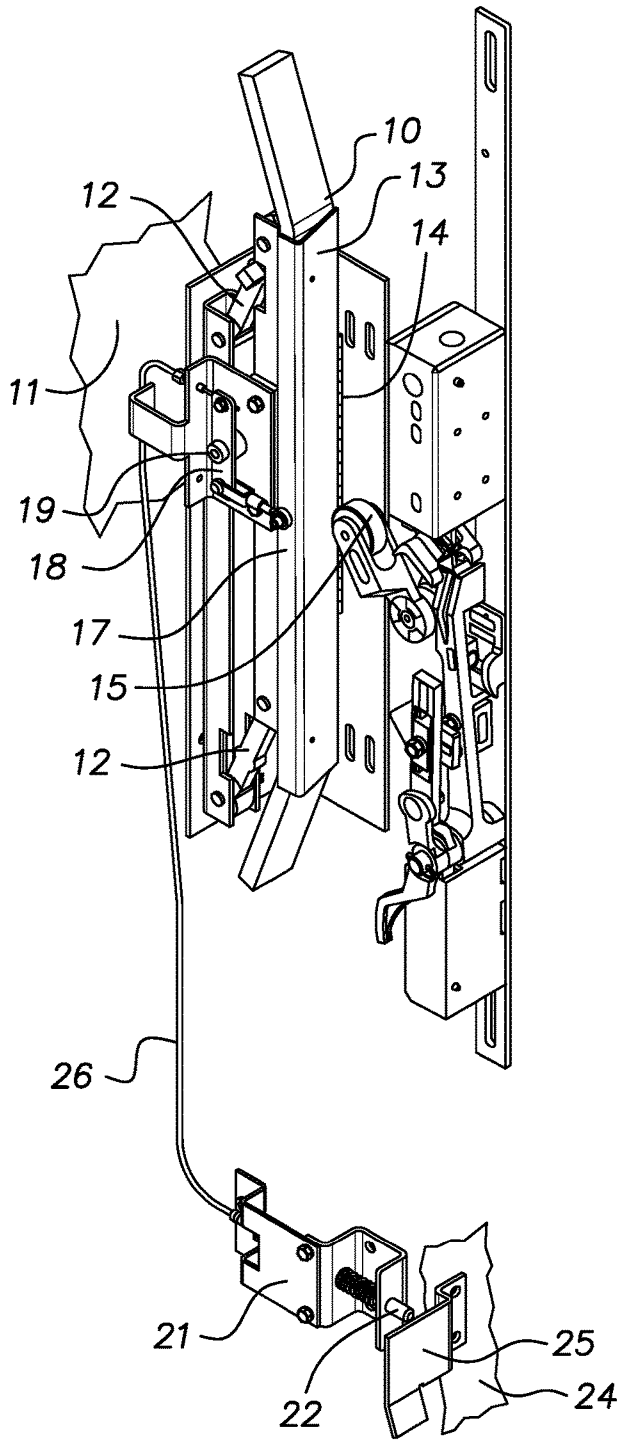
FIG. 1 is an isometric view of a first embodiment of the invention.
Figure 2:
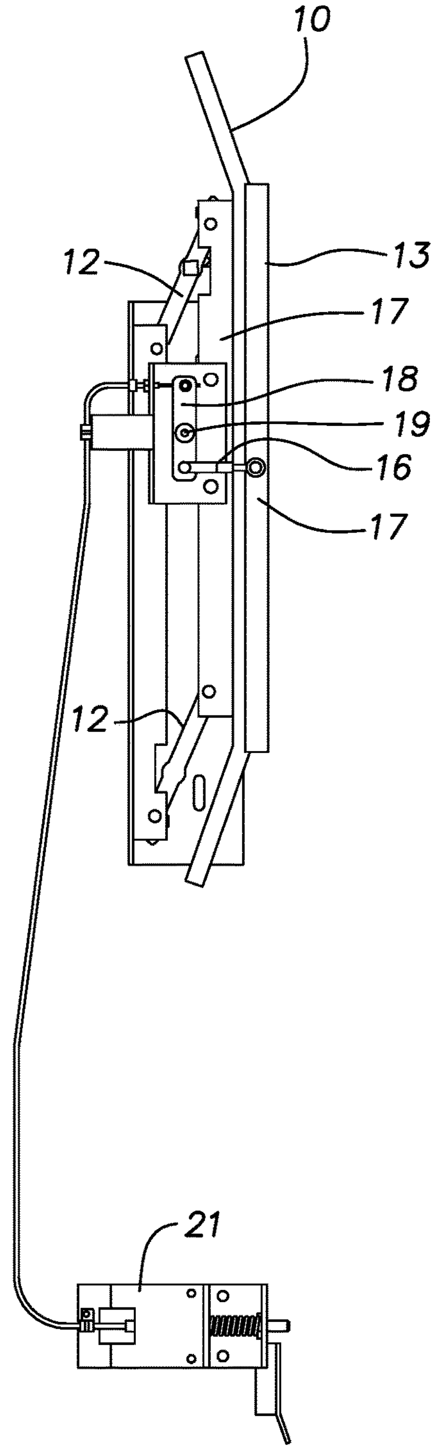
FIG. 2 is a side view of the first embodiment with a retiring cam retracted or retired.

Referring to FIGS. 1 and 2, a system for locking an elevator car door closed is illustrated. As used herein, the term “door” will be understood to mean both door or gate and “landing” will mean both landing or floor. The system includes a retiring cam 10 located on the elevator car schematically represented at 11; the function of the retiring cam is well known to those in the industry. The cam retires or retracts to the position illustrated in FIGS. 1 and 2 upon electrical operation of a solenoid or motor, not shown, by the elevator controller. The solenoid or motor is de-energized when the elevator is at a landing or floor and the cam extends horizontally, being supported on pivotal links 12 that form a parallelogram. In a known manner, extension of the cam unlocks the landing door.

A sheet metal body or plate 13, unique to the invention, is hinged to the retiring cam along a vertical line 14 and covers a working face of the cam. When the elevator car 11 is at a landing, a roller 15 of the landing door lock is displaced by the cam 10, being released by the elevator controller, from its retired position under the influence of spring and/or gravity forces.

Inspection of FIGS. 1 and 2 reveals that the hinged body or plate 13 is pressed against the retiring cam working face by the landing door lock roller 15.

Displacement of the hinged plate 13 relative to the retiring cam 10 is sensed by a mechanism including a link 16 attached to a plate edge 17 and a bell crank 18 on a pivot 19 fixed relative to the cam. An end of the bell crank 18 moves in the opposite direction of the plate edge 17.

A bracket 21 fixed on the elevator car 11 supports a horizontal slide bolt 22 biased to a locking position by a compression spring. In the locking or extended position, the slide bolt obstructs the opening path of a bracket 25 fixed to a vertically sliding door, schematically illustrated at 24. The bell crank 18 and slide bolt 22 are coupled by a Bowden cable 26 having an internal wire and external sheath elements. Hinging motion of the plate 13 on the retiring cam when the landing lock roller 15 engages the plate on the extended retiring cam, causes retraction of the slide bolt 22 through operation of the cable 26 and release of the car door 24 for opening movement. The landing lock roller 15 is only capable of engaging the retiring cam plate 13 when the elevator car 11 is vertically (and horizontally) aligned with a landing and the retiring cam 10 is released or deployed by the elevator control and is thereby extended.

Figure 3:
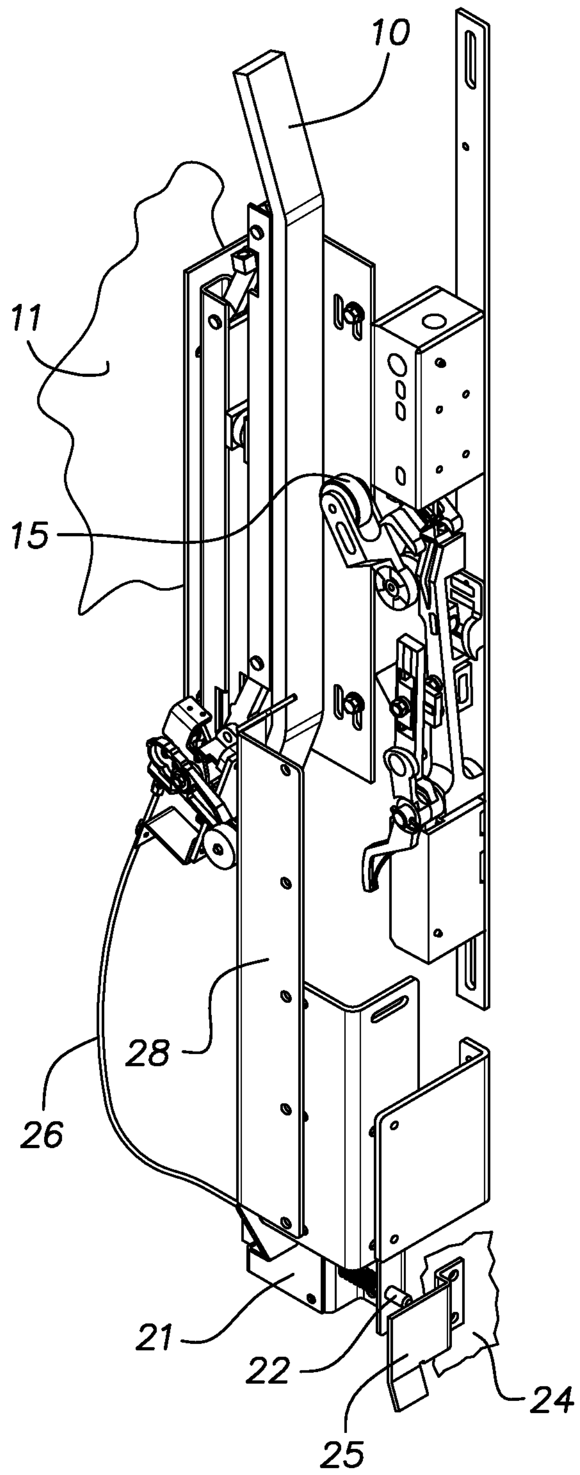
FIG. 3 is an isometric view of a second embodiment of the invention.
Figure 4:
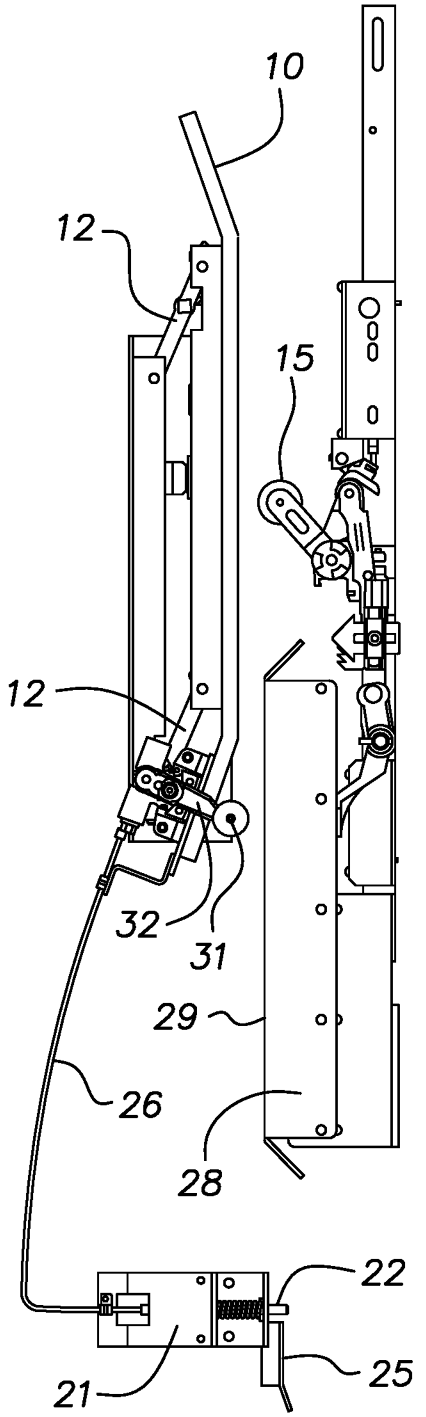
FIG. 4 is a side view of the second embodiment.

With reference to FIGS. 3 and 4, the same numerals used in FIGS. 1 and 2 are used here where the elements are the same or analogous. Fixed to a lower end of the retiring cam is a roller 31 on a pivotal arm 32. In a free state, the roller resiliently extends horizontally outward of the plane of the operating face of the retiring cam. A sheet metal cam on plate 28, with a vertical face 29 is rigidly fixed on the elevator shaft or hoistway at locations corresponding to each landing. The fixed cam face 29 presses against the roller 31 and pivots the arm 32 when the retiring cam 10 is extended at a vertical position corresponding to the car being level with a landing. At this time, the retiring cam 10 engages the landing door lock roller 15 to unlock the landing door.

Pivotal motion of the arm 32 draws the interior wire of the Bowden cable 26 and retracts the lock bolt 22 to release the car door to which the bracket 25 is rigidly fixed. If the retiring cam is released or extended where the elevator car is not aligned with a floor, the sheet metal cam 28 and the pivotal roller 31 do not interact.

It will be understood that a power failure will not affect the performance of the car door lock of either embodiment.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

For example, an electrical interlock, known in the industry, can be added to the lock bolt to prove, positively, that a lock has been made.

What is claimed is:

1. An elevator car with a vertical sliding door and with a retiring cam that extends for releasing a landing door lock, a lock for maintaining said car door locked and being independent of a landing door lock, the retiring cam being constructed and arranged to unlock said car door lock when extended to unlock a landing door.

2. An elevator car as set forth in claim 1, wherein a body on the retiring cam is mechanically linked to the car door lock.

3. An elevator car as set forth in claim 2, wherein the car door lock is mechanically linked to the body on the retiring cam by a Bowden cable.

4. An elevator car as set forth in claim 2, wherein the body is a plate movably mounted forward of an operative face of the retiring cam and engaged by a landing door lock release roller.

5. An elevator car as set forth in claim 2, wherein the body is an element arranged to be displaced relative to the retiring cam by a fixed plate associated with a landing.

6. An elevator car with a vertical sliding door operating in a hoistway and with a retiring cam that extends for opening a landing door lock when deployed, a car door lock independent of the landing door lock, a body carried on and movable relative to the retiring cam, the body being mechanically connected to the car door lock, the body, car and hoistway being constructed and arranged for the body to be displaced relative to the retiring cam when the retiring cam is deployed and the car is aligned with a landing of the hoistway, the mechanical connection between the body and car lock serving to open the car door lock when the body is displaced relative to the retiring cam.

* * * * *